(12) United States Patent
Rolt

(10) Patent No.: US 9,376,213 B2
(45) Date of Patent: Jun. 28, 2016

(54) DISTRIBUTED PROPULSION SYSTEM AND METHOD OF CONTROL

(71) Applicant: ROLLS-ROYCE PLC, London (GB)

(72) Inventor: Andrew Martin Rolt, Derby (GB)

(73) Assignee: ROLLS-ROYCE plc, London (GB)

( * ) Notice: Subject to any disclaimer, the term of this patent is extended or adjusted under 35 U.S.C. 154(b) by 938 days.

(21) Appl. No.: 13/644,900

(22) Filed: Oct. 4, 2012

(65) Prior Publication Data

US 2013/0094963 A1 Apr. 18, 2013

(30) Foreign Application Priority Data

Oct. 13, 2011 (GB) .................................. 1117692.2

(51) Int. Cl.
*B64D 27/24* (2006.01)
*B64D 27/02* (2006.01)

(52) U.S. Cl.
CPC ................ *B64D 27/24* (2013.01); *B64D 27/02* (2013.01); *Y02T 50/62* (2013.01)

(58) Field of Classification Search
CPC ........ B64D 27/24; B64D 27/02; Y02T 50/62; B64C 11/30; F01D 7/00
USPC .......... 416/31; 322/17, 20, 24, 25, 28, 29, 46, 322/49, 62, 64, 90
See application file for complete search history.

(56) References Cited

U.S. PATENT DOCUMENTS

| | | | | |
|---|---|---|---|---|
| 3,112,088 A * | 11/1963 | Speechley | ................. | B60F 5/02 244/17.19 |
| 3,426,982 A * | 2/1969 | Markwood | ............. | B64C 27/28 244/17.19 |
| 4,720,059 A * | 1/1988 | Stearns, Jr. | ............... | B64C 27/52 244/17.11 |
| 5,000,398 A * | 3/1991 | Rashev | .................... | B64D 5/00 244/110 E |
| 5,973,440 A * | 10/1999 | Nitzsche | ............... | F16F 15/005 310/26 |
| 6,065,718 A * | 5/2000 | Piasecki | .................. | B64C 27/08 244/17.11 |
| 6,168,383 B1 * | 1/2001 | Shimizu | ................ | B64C 27/463 415/119 |
| 6,607,161 B1 * | 8/2003 | Krysinski | ................. | B64C 9/00 244/56 |
| 8,052,081 B2 * | 11/2011 | Olm | .......................... | B64C 1/30 244/17.23 |

(Continued)

FOREIGN PATENT DOCUMENTS

GB 497156 12/1938
WO WO 2005/100154 A1 10/2005

OTHER PUBLICATIONS

Fung, An Introduction to the Theory of Aeroelasticity, 1955, Dover Publications, Inc., pp. 320-321.*

(Continued)

*Primary Examiner* — Igor Kershteyn
*Assistant Examiner* — Aaron R Eastman
(74) *Attorney, Agent, or Firm* — Oliff PLC

(57) ABSTRACT

This invention relates to a method and apparatus for controlling power distribution in an electrical aircraft propulsive system having at least one electrical propulsion unit which includes a plurality of rotatable blades, each blade having an adjustable pitch; a pitch adjusting mechanism for adjusting the pitch of the blades; at least one electrical machine electrically connected to the electrical propulsion unit so as to provide electrical power when in use; and, a control system, the method comprising the steps of: determining the required propulsion; determining whether the propulsive units are delivering the required propulsion; and, adjusting the pitch angle of the blades of at least one propulsive unit so as to increase or decrease the propulsion provided by that propulsive unit.

12 Claims, 4 Drawing Sheets

(56) References Cited

U.S. PATENT DOCUMENTS

2010/0013223 A1* 1/2010 Certain ............... B60K 6/24 290/31
2011/0121127 A1* 5/2011 Certain ............... B64C 27/12 244/17.19

OTHER PUBLICATIONS

Feb. 9, 2012 Search Report issued is British Patent Application No. GB1117692.2.

* cited by examiner

DISTRIBUTED PROPULSION SYSTEM AND METHOD OF CONTROL

TECHNICAL FIELD OF INVENTION

This invention relates to an electrical distributed power system for an aircraft and a method of controlling the same. In particular, this invention relates to the use of blade pitch control to distribute power and manage parasitic oscillations within the system.

BACKGROUND OF INVENTION

Conventional state of the art propulsion systems for large civil aircraft typically include one or more gas turbine engines placed under the wings of the aircraft. However, some studies have indicated that so-called distributed propulsion, which involves having numerous smaller propulsion units preferentially arranged around an aircraft, may provide some significant benefits in terms of noise reduction and fuel efficiency when compared with the current state of the art propulsive arrangements.

One known arrangement for distributed propulsion is that used for helicopters where one or more engines is connected to two variable pitch rotors, either to two main rotors, or to a main rotor and a tail rotor, using a mechanical transmission system. Such systems typically incorporate shafts and fixed ratio gearboxes. Such systems do however include clutches to enable the engines individually to be disconnected from the rest of the system in the event that they are not producing power.

It is also known to apply mechanically synchronised systems to vertical take-off aircraft such as tilt-rotor aircraft, where the rotor speeds are mechanically synchronised. In these transmission systems the power that is absorbed by each rotor, or that is generated through gyro-rotation, is regulated by means of a collective pitch mechanism, which sets the desired pitch angle on all of the blades of the rotor. Such a mechanical transmission system might also be applied to a more conventional aircraft with distributed propulsion, where the engines are wholly or partly separated from the rotors that provide the means of propulsion.

It is also known to provide numerous electrical propulsive units which are located so as to capture and accelerate slow speed boundary layer air which has formed against the surface of the aircraft. This can lead to a significant reduction in overall fuel burn with the maximum benefit of boundary layer ingestion being achieved when the low speed flow is not mixed with the freestream flow, but is accelerated to homogeneous conditions by the propulsion system.

One option for such an arrangement is to provide one or more electrical generators powered by gas turbine engines and use the generated electricity to power the various propulsive units which are arranged around the aircraft. However, such a system is electrically complex and would require a high degree of control to keep it stable. Such control would conventionally come from power electronics. However these would be prohibitively large and heavy for the required levels of power and redundancy required for aero applications.

The present invention seeks to provide an electrical distributed propulsive system which addresses the control of an electrical distributed propulsive system.

STATEMENTS OF INVENTION

In a first aspect, the present invention provides a method of controlling power distribution in an electrical aircraft propulsive system having at least one electrical propulsion unit which includes a plurality of rotatable blades, each blade having an adjustable pitch; a pitch adjusting mechanism for adjusting the pitch of the blades; at least one electrical machine electrically connected to the electrical propulsion unit so as to provide electrical power when in use; and, a control system, the method comprising the steps of: determining the required propulsion; determining whether the propulsive units are delivering the required propulsion; and, adjusting the pitch angle of the blades of at least one propulsive unit so as to increase or decrease the propulsion provided by that propulsive unit.

Using adjustable pitch to control the power distribution in an electrical distributed propulsive system allows the power taken or delivered by a propulsive unit to be controlled without an electronic power convertor. This provides significant benefits in terms of weight and reliability for an aircraft based system. The method can also be used advantageously used to actively damp oscillations in the propulsive system.

The step of determining whether the propulsive units are delivering the required propulsion may comprise: monitoring the rotational state and pitch angle of the rotatable blades; determining whether the rotational state is within a predetermined range.

Monitoring the rotational state may include monitoring the angular position of the blades and determining either or both of the rotational speed and angular acceleration of the rotatable blades.

The method of the first aspect may further comprise the step of: determining whether there are parasitic oscillations in the rotation of the blades and adjusting the pitch of the blades to damp the oscillations. Determining whether there are parasitic oscillations may include the step of monitoring the acceleration and deceleration of the rotor.

The method may further comprise adjusting the pitch of the blades such that the propulsive unit generates electrical energy for the electrical network.

In one embodiment, only a portion of the propulsive units may be used to act as dampers.

In a second aspect the present invention provides an electrical propulsion system for an aircraft, comprising: at least one electrical propulsion unit having a plurality of rotatable blades, each blade having an adjustable pitch; a pitch adjustment mechanism for adjusting the pitch of the blades; at least one electrical machine electrically connected to propulsion unit so as to provide electrical power in use; and, a control system configured to determine the required propulsion and propulsion being delivered by the propulsive system and adjust the pitch of the blades of at least one propulsive unit as to increase or decrease the propulsion provided by that unit.

The control system may be configured to monitor the rotational state and pitch angle of the rotatable blades and determine whether the rotational state is within a predetermined range.

Monitoring the rotational state may include monitoring the angular position of the blades and determining either or both of the rotational speed and angular acceleration of the rotatable blades.

The control system may be further configured to determine whether there are parasitic oscillations in the rotation of the blades and issue a control signal to the pitch adjustment mechanism to adjust the pitch of the blades so as to damp the oscillations.

The control system may further comprise a central control system for controlling the distribution of power between the propulsion units and a secondary control units at each of the plurality of propulsive units, the secondary control units for determining whether the propulsive units are operating within predetermined rated limits.

DESCRIPTION OF DRAWINGS

The following drawings are used to describe embodiments of the invention, in which.

DETAILED DESCRIPTION OF INVENTION

Figure 1:
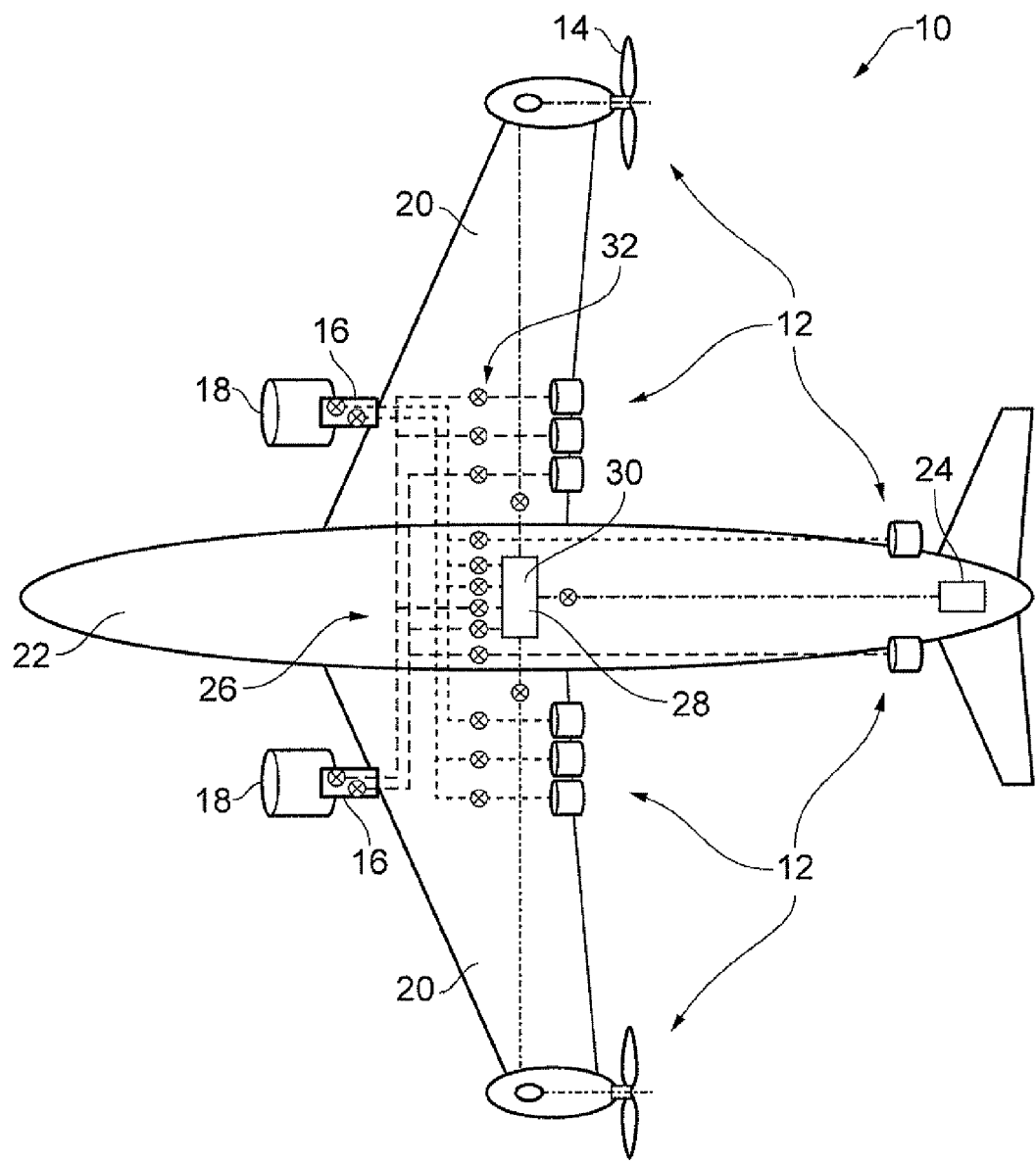
FIG. 1 shows an overview of an aircraft having the electrical propulsive system according to a first embodiment.

In FIG. 1 there is shown a schematic representation of an aircraft having the electrical propulsive system 10 according to the present invention. The electrical propulsive system 10 includes a plurality of electrical propulsion units in the form of fans 12 which are rotatably driven by superconducting electrical machines. Each of the fan units 12 includes a rotor having fan blades 14 mounted on a rotatable hub and a blade pitch adjustment mechanism for synchronously adjusting the pitch of the blades 14 relative to the air flow which passes them in use. Although only the propulsive units on the wings are shown as having blades 14, it will be appreciated that all of the propulsive units 12 include fans and blade arrangements as described.

The pitch adjustment mechanism can be any known in the art. In one embodiment, each fan blade 14 is mounted to the hub so as to be rotatable about its longitudinal axis via a shaft which passes into the hub and engages with the pitch control mechanism. The pitch control mechanism is typically a rotary electrical or hydraulic actuator which is arranged to drive the shafts via some gearing. As mentioned, the pitch control mechanism is operable on all of the fan blades simultaneously so as to avoid a non-symmetrical load profile on the hub. Altering the pitch changes the attitude of the blade to the oncoming airstream and the amount of torque experienced by the rotor. Hence, adjusting the attitude of the blades to a coarse setting increases the torque on the blade and reducing the pitch will reduce the torque. As will be appreciated, it is also possible to set the pitch of the blades such that the electrical machine begins to extract energy from the airstream, thereby generating electrical power.

The electrical propulsive units 12 are placed in various locations around the fuselage 22 and wings 20 of the aircraft so as to ingest boundary layer air which is energised and exhausted to provide propulsive thrust. Having a plurality of smaller propulsive units 12 rather than two (or more) large gas turbine engines helps reduce drag and allows for a more efficient by pass ratio of the propulsive system 10, thereby increasing efficiency of the aircraft.

In the described embodiment, there are six electrical propulsion units 12 located towards the trailing edge of the wing and two located towards a rear portion of the fuselage flanks. Two further units are located on the tips of the wings. All of the propulsive units 12 may be of the ducted variety or open rotor propellers as are known in the art.

The electrical machines which drive the propulsive units 12 are superconducting synchronous machines having superconducting rotors which are permanently magnetised in use. The rotors are driven using stator windings which may or may not be superconducting. Such machines are known in the art. As will be appreciated, the machines may be operated as motors or generators.

The electrical propulsion system 10 also includes a plurality of electrical sources in the form of electrical generators 16 in the form of synchronous machines, which are driven by two main gas turbine engines 18 located underneath the wings 20. The gas turbine engines 18 operate in a conventional manner but are configured for operation as part of a distributed propulsion system 10 and as such may have a reduced bypass ratio so as to reduce aero-dynamic drag.

The electrical generators 16 and superconducting machines of the propulsive units 12 are electrically connected via cables in the form of a bus system 26 and as such collectively form an electrical network. As will be appreciated, the electrical network may also include ancillary equipment in the form of isolators and fault current limiters which are generally indicated by reference numeral 32. The electrical generators 16, bus system 26 and fault current limiters within the network may or may not be superconducting.

The propulsive system 10 includes a control system which has at least one controller 28 which is configured, at least in part, to monitor and determine the required thrust for each propulsive unit and regulate the pitch of the fan blades to control the amount of propulsive force produced. The control system is also configured to monitor the stability of the system and control the pitch of the fan blades to damp out any parasitic oscillations which occur within the system. The control system and its operation are described in more detail below with reference to FIGS. 3 to 4.

As is known in the art, superconductors are required to be held beneath critical levels of temperature, magnetic field and current density in order to be in a superconducting state. Hence, the aircraft includes a cryogenic system to provide the cooling of the superconducting equipment. The cryogenic system includes one or more cryocoolers 30, which may be co-located with the controller or elsewhere, and which controls the flow of a refrigerant to the superconducting equipment. The refrigerant may be delivered to the superconducting equipment via a network of conduits which runs with the superconducting cables. Hence, the refrigerant conduits and superconducting cables are indicated by common dashed lines in FIG. 1.

The superconducting materials may be any known in the art, but preferably a high temperature superconductor such as bismuth strontium calcium copper oxide (BSCCO) or yttrium barium copper oxide (YBCO) would be used and would be cooled by liquid nitrogen or hydrogen. The use of the hydrogen is particularly beneficial as it could also be used to power the aircraft and would reduce the need for a cryocooling system on the aircraft as the liquid hydrogen could be stored as fuel in tanks before being used for cooling and subsequent burning in the engines.

Towards the rear of the fuselage 22 there is a located an auxiliary power unit 24, in the form of a small gas turbine which is arranged to provide electrical power to the aircraft when the main electrical generation system is inoperable, for example, prior to the engines 18 being started. This allows the cryogenic system to be powered prior to engine start.

In the arrangement described above, electrical power flows from the generators 16 to the fans of the propulsive units 12 which are rotated by the superconducting electrical machines so as to provide propulsion for the aircraft. Under steady state conditions, the amount of power entering the electrical network is the same as the power taken by the propulsive units such that there is a power balance within the system. If an increase in propulsive thrust is required, the fuel flow to the engines is increased so as to speed them up and increase the electrical frequency within the network. Due to the use of synchronous machines for the propulsive units, this leads to an increase in the rotational speed of all the fans.

Although the relationship between the propulsive units and engines is reasonably straightforward in steady state conditions, in reality the system would experience large amounts parasitic oscillations in the instantaneous rotor speeds of the propulsive units, particularly where the transmission system is entirely superconducting because it would have almost zero damping.

Oscillations may also be caused by a number of factors such as adjusting the power demand in the propulsive system and local disturbances in the air flow around a propulsion unit which affects the aerodynamic loading on the fan. Faults within the system, such as a loss of a propulsive unit due to an electrical fault or from a bird strike will also provide severe oscillatory disturbance.

Oscillations are problematic in terms of noise and vibration levels and may, in severe cases lead to general instability and the possible de-synchronisation of the electrical machines which would render the propulsive unit in question inoperable. Hence, these parasitic oscillations require damping.

One option for controlling the electrical system in general and damping oscillations is to employ power electronics to control the propulsive units, thus effectively decoupling the units from the electrical network and regulating the power supply to each independently. However, this is problematic in aero applications due to the excessive weight of current power electronics. Further, aero systems require relatively high levels redundancy and back-up to account for failures. This leads to increased components and weight which makes the choice of power electronics an undesirable one.

The control system of the present invention monitors the propulsive demand and the rotational state of the propulsive units to determine whether the power distribution is within acceptable limits and, where necessary, adjust the pitch of the fan blades, thereby forcing a response from a given propulsive unit. This allows the power dissipated by each propulsive unit to be adjusted as required and provides the option to actively dampen vibrations in the system without the need of convertor controlled electrical machines.

Figure 2:
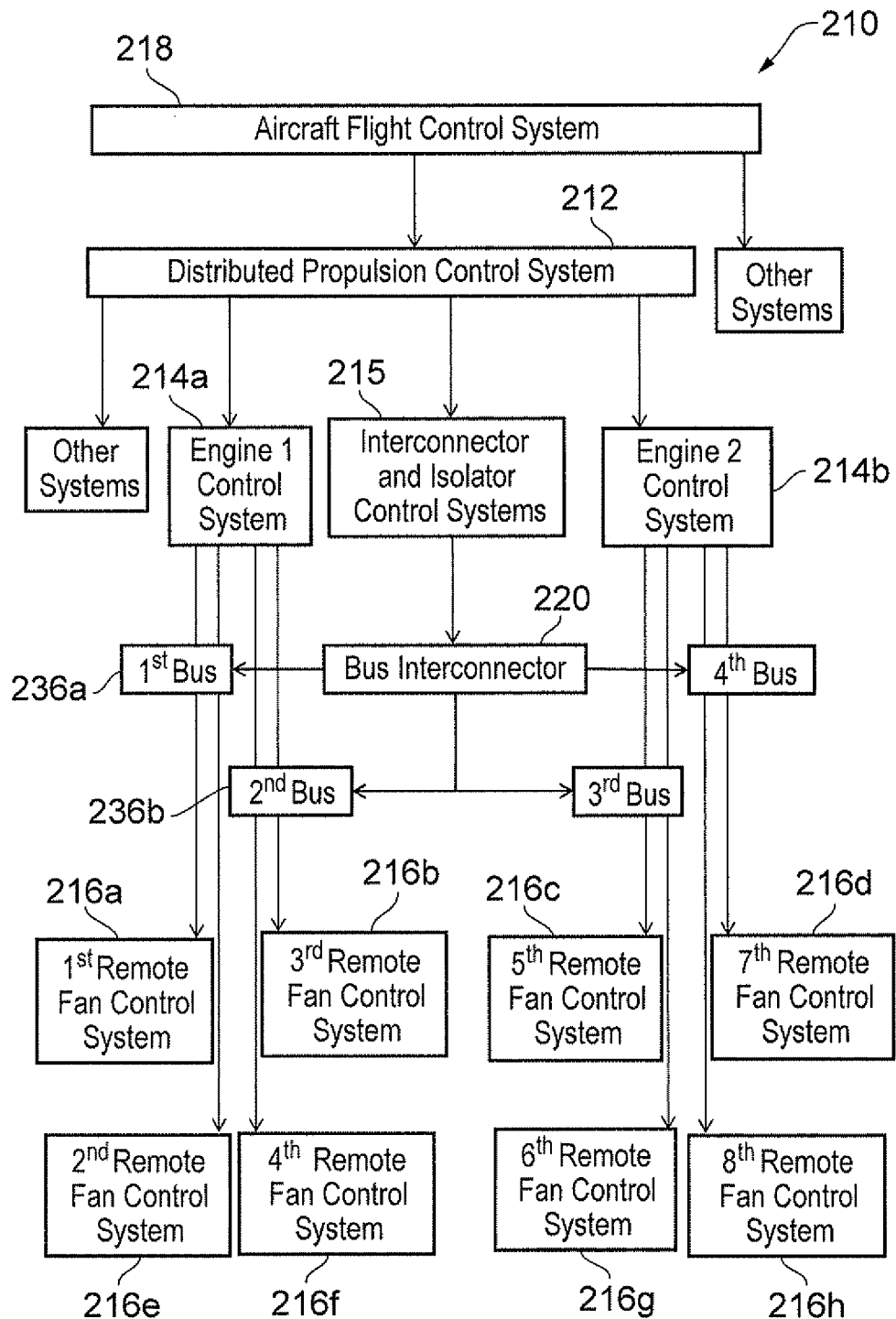
FIG. 2 shows a schematic overview of the control system of an embodiment of the invention.

FIG. 2 provides an overview of the control system 210 and its integration with the electrical network described in FIG. 1. In the described embodiment there is shown two engine control units 214a, 214b, which correspond to the gas turbine engines 18 shown in FIG. 1, an interconnect and isolator control unit 215, which controls the physical configuration of the bus system, and individual propulsive control units 216a-h for each propulsive unit 12.

Each engine 18 is configured to provide power to four separate propulsion units 12 which it does through a bus system 36. As shown in FIG. 2, there are two buses 236a, 236b for each engine 18 with each one being arranged to supply power to two of the propulsion units 12. As will be appreciated, the number of units matched to a particular engine and the distribution of power will depend on the power requirements of the system. Further, within a system there may be a master propulsive unit which determines the rotational frequency of the other propulsive units.

Although not shown, it will be appreciated that the electrical distribution networks which include the buses may be selectively interconnected to allow for rerouting of power when required, for example, in the event of a fault.

The distributed propulsion control unit 212 is a subset of a general aircraft control system 218 which controls all aspects of the aircraft such as the aerodynamic flight control surfaces and related systems. Such control systems are well known in the art and typically comprise some data processing equipment such as a processor and some memory.

The distributed propulsion control unit 212 monitors and controls the gas turbine engines 18 and the distributed propulsive units 12. Thus, the distributed control unit 212 will receive data from the aircraft control system 218, such as the required demand, and determine the appropriate response required from the distributed propulsive units 12 and gas turbine engines 18.

In addition to the main distributed propulsion control unit 212, each propulsion unit includes its own control unit 216a-h which monitors the operating parameters of the propulsion units 12 and acts only in the event of a failure. For example, the distributed propulsive control unit 212 may monitor for overspeeds in the rotor of the distributed propulsive unit 12 or a breakdown in the communications from the main propulsive control unit 212. Hence, in some embodiments, the local control unit 216a-h will include a capacity to control the propulsive unit 12 in an independent safe mode, or to set the pitch of the blades to a feather position to minimise drag and the rotative force on the rotor.

The interconnect and isolation control unit 215 monitors and controls a bus interconnector 220 such that it can reconfigure the electrical network in the event of a fault. For example, if a fault occurs in one of the propulsive units 12 and it needs to be isolated, the interconnect and isolation control unit 215 would receive a signal from the main distributed propulsion control unit 212 to isolate that unit. In some embodiments, the interconnect and isolator control unit 215 will be arranged to act autonomously.

Figure 3:
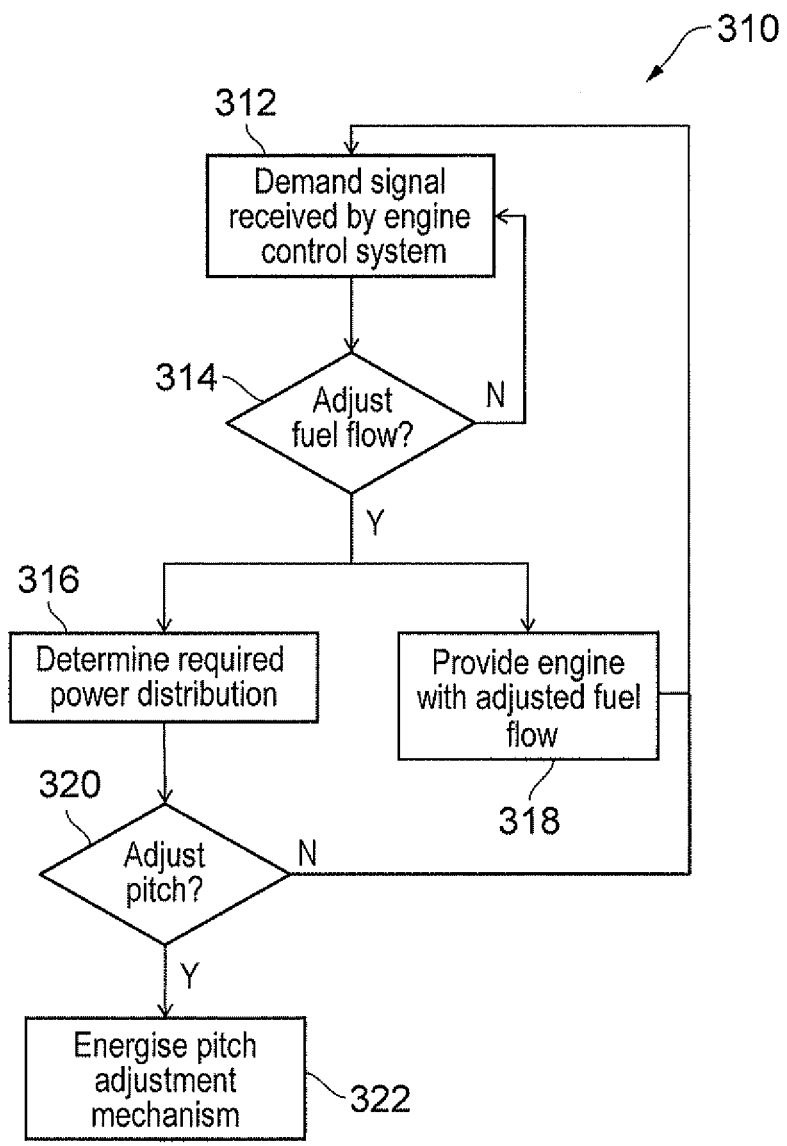
FIG. 3 shows a flow diagram highlighting certain aspects of a control method.

FIG. 3 shows a flow diagram 310 illustrating the control scheme implemented by the engine one control unit 214a shown in FIG. 2. The engine control unit 214a receives a signal of demand 312 which relates to the amount of thrust required, for example, from a throttle signal generated in the cockpit of the aircraft. On the basis of the required demand, the engine control unit determines the overall propulsive thrust and required fuel 314 and adjusts the fuel flow rate 316 to the engine accordingly.

Increasing or decreasing the fuel flow rate to engine one alters the spool speed of the engine and associated generator and electrical frequency within the network. Hence, the rotational speed of the synchronous speed of the rotors of the propulsive units will increase or decrease accordingly, which will affect the resultant thrust. Hence, when a change in demand is required, the engine control unit also evaluates the new distributed propulsive thrust 316 for each of the propulsive units 12 based on either the real time monitoring of the system, or on predicted values for a given rise in frequency. This evaluation may include adjustments to the net distributed power and adjustments to the distribution of the power amongst the various propulsive units 12 such that the aircraft can be made to yaw, for example.

When the required distribution of the power has been determined 318 the associated amount of pitch adjustment is calculated 320 for each propulsion unit and a signal issued to energise the pitch adjustment mechanism 322, with the pitch angle being adjusted accordingly. Adjusting the pitch angle increases or decreases the thrust produced by the propulsive unit and allows the thrust delivered by the unit to be changed.

Figure 4:
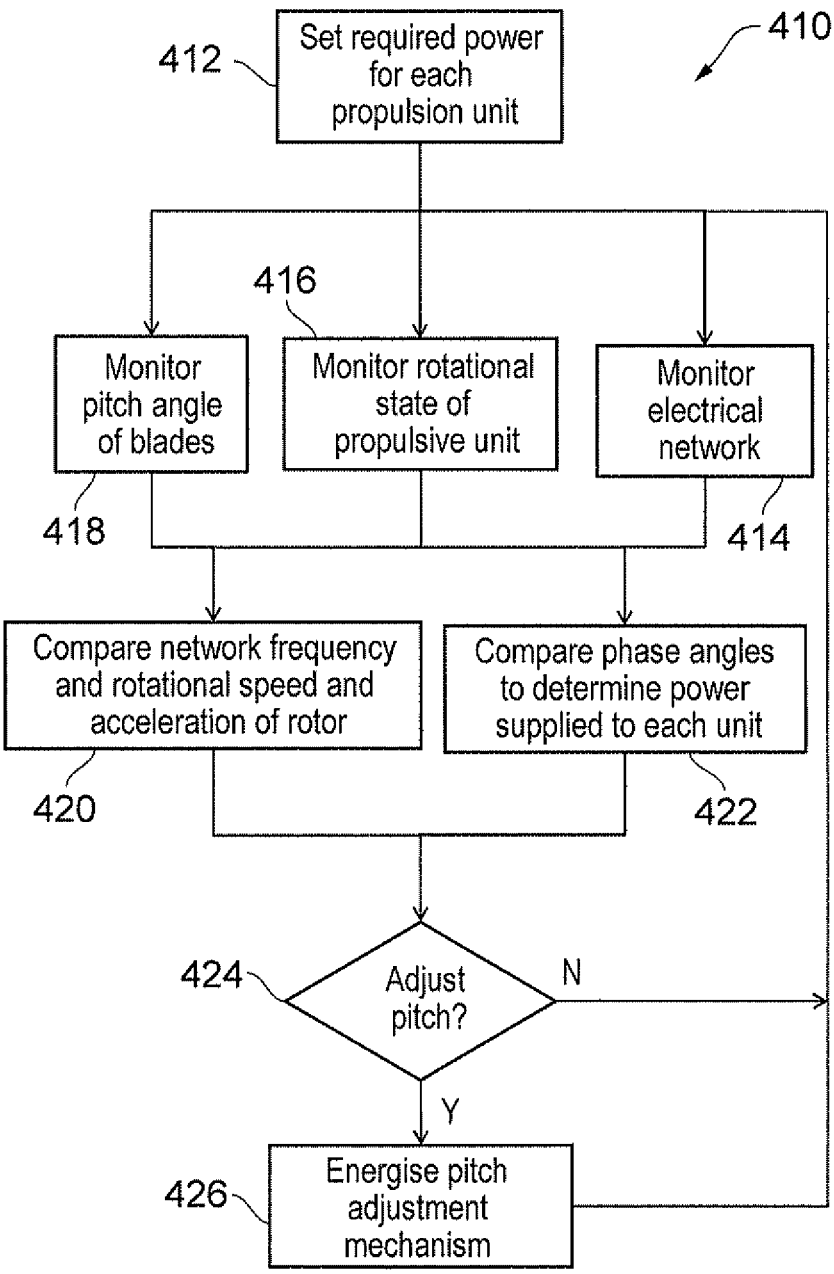
FIG. 4 shows a flow diagram highlighting certain aspects of a control method.

FIG. 4 shows a flow diagram 410 of an embodiment of how the control system determines whether to adjust the pitch of the blades for a required power distribution. Thus, the engine control unit 214a determines the amount of power or thrust 412 which is required from each propulsive unit 12 on the basis of one or more algorithms and the demand information.

The engine control unit 214a then monitors the electrical network 414 to detect the frequency and phase of the current, the rotational state 416 of each propulsive unit 12, and the pitch angle of the blades 418. In this embodiment, the rotational state relates to the acceleration or deceleration of the rotor which is achieved by examining the rotational position over time and integrating to find the speed and acceleration. However, the skilled person will appreciate that other methods may exist for monitoring the rotational state. For example, by frequency analysis of currents or voltages in the associated electrical machines.

Using the frequency in the electrical network and comparing this to the rotational speed of the rotor 420, the control system can determine the condition of the rotational state and calculate whether the rotor should be at steady state or accelerating. In the event that the rotor is accelerating (or decelerating) when it should not be, it is indicative that the system is oscillating, possibly in response to a change in demand. In this case, a prediction is made as to characteristic of the oscillation and the changes in pitch angle required to damp it. This evaluation may be based on an adaptive model which includes previous oscillatory behaviour.

Once the necessary pitch angle has been established 424, the control system issues a control signal 426 to the pitch adjustment mechanism and continues to monitor the rotational state of the rotor so that a steady state or satisfactorily stable performance is achieved.

The system is also configured to monitor the phase angles of the rotor and of the current of the electrical supply 422 to the propulsive unit in order to establish the load angle of the motor. In this way, the power being drawn by the motor can be calculated and the pitch angle can be adjusted should the power or torque exceed a rated value.

In another embodiment, the pitch angle of the blades could be adjusted such that reverse thrust is produced. In this case electrical power could be generated and might be fed into the network to power other systems or be stored. Alternatively, the power could be dumped. Providing a negative pitch in this way may also be advantageous if the one of the motors loses synchronicity and needs to be resynchronised. Reverse thrust may be obtained by turning the blades either through fine pitch or through coarse pitch.

In some embodiments, the motors and generators within the system have different numbers of poles such they can rotate at different rotational speeds for the same alternating current frequency while the pole passing frequency remains synchronised. This is advantageous as it means the slower spool speed of the gas turbine engines can result in fast rotating propulsive units without the need of a gearbox or power electronics.

In some embodiments, the distributed propulsion units are optimised for a typical cruise condition and the proportion of the overall thrust provided by these systems can be reduced at climb and takeoff. This can help reduce the electrical demand on the system and reduce the size of the generators and propulsive units. In order to facilitate this, the blade pitch of the distributed propulsion units can be reduced at lower altitudes to limit the power transferred to them and to keep within the design torque and current limits for the superconducting electrical machines.

It will be appreciated that the control system includes the necessary sensors, control loops and algorithms for carrying out the various steps of the method as are generally known in the art. For example, the pitch adjustment mechanism may include a position sensor in the form of an optical or Hall-Effect absolute rotary encoder which monitors the rotational position of each blade. There may also be various vibration detection elements in order to ascertain that all of the blades have moved synchronously. For example, the rate of fuel flow to the engine may be made in accordance with predetermined values which relate the fuel burn to the electrical output of the generator and control of the fuel may incorporate various sensors, control loops and algorithms in order to provide the required electrical and mechanical power.

The above embodiments are examples of the invention defined by the scope of the claims below and should not be taken as limiting.

Although the above described embodiments relate to electrical generators driven by gas turbine engines, it will be appreciated that the electrical power may be provided by one of the electrical propulsion units. Further, although the above embodiments relate to propulsion units which all have variable pitch blades, some of the propulsion units may have fixed blades.

The invention claimed is:

1. A method of controlling power distribution in an electrical aircraft propulsion system, the electrical aircraft propulsion system including: (i) a plurality of electrical propulsion units, each of the plurality of electrical propulsion units having a plurality of rotatable blades on a rotor, each blade of the plurality of blades having an adjustable pitch; (ii) a pitch adjusting mechanism for each of the plurality of electrical propulsion units, each pitch adjusting mechanism being configured to adjust the pitch of the plurality of blades of each of the plurality of propulsion units simultaneously so as to avoid a non-symmetrical load profile on a hub; (iii) at least one electrical machine electrically connected to the plurality of electrical propulsion units so as to provide electrical power when in use; and (iv) a control system, the method comprising steps of:
determining a required propulsion;
determining whether the plurality of propulsion units are collectively delivering the required propulsion; and
simultaneously adjusting a pitch angle of the plurality of blades of at least one of the plurality of propulsion units so as to increase or decrease the propulsion provided by that propulsion unit.

2. The method of controlling power distribution in the electrical aircraft propulsive system as claimed in claim 1, wherein the step of determining whether the plurality of propulsion units is delivering the required propulsion includes, for each propulsion unit:
monitoring a rotational state and pitch angle of the rotatable blades; and
determining whether the rotational state is within a predetermined range.

3. The method of controlling power distribution in the electrical aircraft propulsive system as claimed in claim 2, wherein the monitoring the rotational state includes:
monitoring an angular position of the blades; and
determining either or both of a rotational speed and angular acceleration of the rotatable blades.

4. The method of controlling power distribution in the electrical aircraft propulsive system as claimed in claim 1, further comprising the step of:
determining whether parasitic oscillations exist in the rotation of the blades in one or more of the plurality of propulsion units, and adjusting the pitch of the blades to damp the oscillations.

5. The method of controlling power distribution in the electrical aircraft propulsive system as claimed in claim 4, wherein the determining whether parasitic oscillations exist includes a step of monitoring an acceleration and deceleration of the rotor.

6. The method of controlling power distribution in the electrical aircraft propulsive system as claimed in claim 4, wherein only a portion of the propulsion units in the plurality of propulsion units is used to act as dampers.

7. The method of controlling power distribution in the electrical aircraft propulsive system as claimed in claim 1, further comprising adjusting the pitch of the blades in one or more propulsion units of the plurality of propulsion units to generate a reverse thrust in order to generate electrical energy for an electrical network.

8. An electrical propulsion system for an aircraft, comprising:
- a plurality of electrical propulsion units each having a plurality of rotatable blades, each blade of the plurality of blades having an adjustable pitch;
- a pitch adjustment mechanism for each of the plurality of electrical propulsion units, each pitch adjusting mechanism being configured to adjust the pitch of the plurality of blades of each of the plurality or propulsion units simultaneously so as to avoid a non-symmetrical load profile on a hub;
- at least one electrical machine electrically connected to the plurality of propulsion units so as to provide electrical power in use; and
- a control system configured to; (i) determine a required propulsion and propulsion being delivered by the propulsion system, and (ii) simultaneously adjust the pitch of the plurality of blades of at least one propulsion unit of the plurality of propulsion units so as to increase or decrease the propulsion provided by that propulsion unit.

9. The electrical propulsion system for the aircraft as claimed in claim 8, wherein the control system is configured to: (i) monitor a rotational state and pitch angle of the rotatable blades, and (ii) determine whether the rotational state is within a predetermined range.

10. The electrical propulsion system for the aircraft as claimed in claim 9, wherein the monitoring of the rotational state includes: (i) monitoring an angular position of the blades, and (ii) determining either or both of a rotational speed and angular acceleration of the rotatable blades.

11. The electrical propulsion system for the aircraft as claimed in claim 8, wherein the control system is further configured to: (i) determine whether parasitic oscillations exist in the rotation of the blades in one or more of the plurality of propulsion units, and (ii)issue a control signal to the pitch adjustment mechanism of the one or more of the plurality of propusion units to adjust the pitch of the blades so as to damp the oscillations.

12. The electrical propulsion system for the aircraft as claimed in claim 8, wherein the control system includes: (i) a central control system configured to control a distribution of power between the plurality of propulsion units, and (ii) a secondary control unit at each of the plurality of propulsion units, the secondary control unit configured to determine whether the propulsion units are operating within predetermined rated limits.

\* \* \* \* \*